United States Patent [19]

Roberts et al.

[11] Patent Number: 4,859,435

[45] Date of Patent: * Aug. 22, 1989

[54] DEOXYGENATION OF INERT GAS STREAMS WITH METHANOL

[75] Inventors: George W. Roberts, Emmaus; Shivaji Sircar, Wescosville; Paul Stepanoff, Quakertown, all of Pa.

[73] Assignee: Air Products and Chemicals, Inc., Allentown, Pa.

[*] Notice: The portion of the term of this patent subsequent to Aug. 22, 2006 has been disclaimed.

[21] Appl. No.: 205,408

[22] Filed: Jun. 10, 1988

[51] Int. Cl.$^4$ .................... C01B 21/04; C01B 23/00
[52] U.S. Cl. .................... 423/219; 423/230; 423/245.3; 423/262; 423/437; 423/351
[58] Field of Search ............... 423/262, 219, 245, 580, 423/437, 651, 230, 245.3, 351

[56] References Cited

U.S. PATENT DOCUMENTS

| 3,804,756 | 4/1974 | Callahan et al. | 423/245 |
| 4,191,733 | 3/1980 | Swift et al. | 423/245 S |
| 4,304,761 | 12/1981 | Yu Yao | 423/213.2 |
| 4,673,556 | 6/1987 | McCabe et al. | 423/245 |

FOREIGN PATENT DOCUMENTS

| 0068377 | 1/1983 | European Pat. Off. | 423/245 |
| 60-122709 | 7/1985 | Japan | 423/262 |
| 766626 | 9/1980 | U.S.S.R. | 423/245 |

OTHER PUBLICATIONS

"Gold and Platinum Catalysed Oxidation of Methanol" by Colin N. Hodges and Leonard C. Roselaar appearing in *Journal of Applied Chemical Bio-Technology* 1975 vol. 25, pp. 609 to 614.

"Catalytic Oxidation of Methanol Over Platinum" by J. G. Firth, appearing in *TransFarady Society* 1971 vol. 67, p. 212.

*Primary Examiner*—Jack Cooper
*Attorney, Agent, or Firm*—Geoffrey L. Chase; James C. Simmons; William F. Marsh

[57] ABSTRACT

The present invention is directed to a process for removing minor amounts of oxygen from inert gas streams to result in very low levels of oxygen contamination in such inert gas streams, wherein the oxygen is removed by the action of stoichiometric quantities of methanol, which react with the oxygen over a catalyst at ambient feed temperature conditions without a requirement for external heating of the reaction.

14 Claims, No Drawings

_4,859,435_

DEOXYGENATION OF INERT GAS STREAMS WITH METHANOL

TECHNICAL FIELD

The present invention is directed to catalytic removal of oxygen from inert gases. More specifically, the present invention is directed to scavenging minor oxygen contamination from inert gases to produce high purity inert gases for special applications.

BACKGROUND OF THE PRIOR ART

The reaction of methanol and oxygen is known in the prior art. This reaction has been catalyzed by various catalytic species such as platinum, gold and palladium.

In U.S. Pat. No. 4,304,761 various oxidation routes for methanol are set forth including the reaction of methanol with oxygen to produce carbon dioxide and water. In that patent, experiments were conducted to arrive at a system for reducing methanol emissions from internal combustion exhaust gases. Large excesses of oxygen were utilized, wherein the oxygen to methanol ratio was 6.25, which is more than four times the stoichiometric requirement. Complete conversion of methanol requires temperatures of at least 125° C. (257° F.). At temperatures lower than the recited temperature, the methanol oxidized incompletely thus forming formaldehyde byproduct. The patent teaches that in order to get complete oxidation of methanol to carbon dioxide and water one should use stoichiometric excesses of oxygen and temperatures above 125° C., well above ambient conditions. The catalysts demonstrated for activity included platinum, palladium, rhodium and silver.

In an article by Collin N. Hodges and Leonard C. Roselar entitled Gold and Platinum Catalyzed Oxidation of Methanol appearing in the Journal of Applied Chemical Bio-Technology 1975 vol. 25 pages 609 to 614, the oxidation of methanol under oxygen deficient conditions (oxygen/methanol=0.5 mol fraction) using a platinum gauze catalyst was studied. The article indicates that the lowest reaction temperature of 150° C. (302° F.) resulted in the formation of formaldehyde. It required temperatures of 190° to 225° C. (374° to 437° F.) to produce a hydrogen or carbon dioxide product from methanol oxidation over a platinum catalyst. There is no suggestion in that article that lower temperatures, particularly temperatures approximating ambient, could result in complete conversion of methanol or any suggestion as to what reaction of near stoichiometric amounts of methanol and oxygen would accomplish.

In another article by J. G. Firth entitled Catalytic Oxidation of Methanol Over Platinum appearing in TransFaraday Society 1971 Volume 67 page 212, the oxidation of methanol was studied under conditions of excess oxygen (oxygen to methanol ratios of 2.5 up to 20) using a platinum catalyst. Some platinum catalyst activity was observed at ambient temperatures of 27° C. (80.6° F.), but at those temperatures methanol conversion was relatively low.

None of the above prior art suggests the viability of feeding a commercial inert gas stream that is contaminated with oxygen along with a stoichiometric quantity of methanol at ambient temperature to a reactor with no external heating, that effectively results in complete conversion of methanol and oxygen to innocuous byproducts of carbon dioxide and water. The present invention achieves such a result using appropriate catalyst to result in an efficient economical oxygen scavenging process as set forth below.

BRIEF SUMMARY OF THE INVENTION

The present invention is a process for essentially complete removal of minor amounts of oxygen from inert gas streams comprising reacting a stoichiometric amount of methanol with said oxygen at a feed gas temperature in the range of approximately 60° to 120° F. in the presence of a catalytic amount of well dispersed, metallic palladium to convert the oxygen and methanol to carbon dioxide and water without external heating of the reaction.

Preferably, the oxygen content of the inert gas stream is reduced to no more than 10 ppm oxygen.

In one embodiment, the preferred inert gas is a commercial nitrogen product. In another embodiment, the preferred inert gas stream is an argon product.

Preferably, the catalyst utilized is palladium dispersed on an alumina support.

Optimally, the oxygen to methanol mol ratio is approximately 1.5:1.

Preferably, the initial oxygen content of the inert gas stream is in the range of approximately 0.1 to 10 mol%.

Optimally, the feed temperature is in the range of 60° to 75° F.

Alternatively, the resulting deoxygenated inert gas stream containing carbon dioxide and water is further treated by passage through sorptive beds to selectively remove said carbon dioxide and water. Optimally, the resulting deoxygenated inert gas stream containing carbon dioxide and water is cooled to condense out the major amount of water, passed through a bed of alumina or a zeolite to remove residual water and passed through a bed of zeolite to remove carbon dioxide.

Preferably, the catalyst is approximately 0.05 to 1.0 wt% palladium in the metal form with a metal surface area of at least 0.4 m$^2$/g and a palladium dispersion of at least 30.0%.

Optimally, the temperature of the feed to the reactor is approximately 68° F.

Preferably, the space velocity of the reactor is in the range of approximately 0.10 hr$^{-1}$ up to 100,000 hr$^{-1}$.

Optimally, the space velocity of the reactor is in the range of approximately 5,000 hr$^{-1}$ up to 20,000 hr$^{-1}$.

Alternatively, the inert gas stream can initially be saturated with water.

DETAILED DESCRIPTION OF THE INVENTION

Certain processes for the production of inert gases, such as nitrogen and argon, produce a gas that contains low levels of oxygen. Typically, the oxygen content of such streams ranges from about 0.1 mol% to about 5 mol%. Examples of processes that produce such streams are cryogenic distillation of air to produce argon, pressure-swing or vacuum swing adsorptive separation of air to produce nitrogen and membrane separation of air to produce nitrogen. In some cases, the inert gas can be used without further reduction of the oxygen concentration. For example, nitrogen containing up to a few mol% oxygen can frequently be used for an application such as inerting. However, in other applications, only very low levels of oxygen can be tolerated in the inert gas stream. Many applications of argon and nitrogen in metals processing, such as annealing, welding, carburizing and semi-conductor manufacture fall into this category. For such applications, the oxygen content of the inert gas stream must be reduced to very low levels, typically less than 10 parts per million.

The traditional means to reduce the oxygen concentration of nitrogen or an argon stream is via catalytic reaction of the oxygen with hydrogen. Hydrogen is added to the oxygen containing inert gas and the resulting stream is passed through a bed of catalyst, where the hydrogen and oxygen react to form water. This water is then removed from the gas stream by cooling with condensation and further by passing it through a molecular sieve drying system. It is necessary to use a very slight excess of hydrogen relative to the stoichiometric requirement in order to reduce the oxygen concentration in the final product to less than 10 PPM. In practice, hydrogen has several significant advantages for this application. In the first place, hydrogen and oxygen are very reactive. Over certain catalysts, the reaction will proceed rapidly, even when the gas entering the catalyst bed is at ambient temperature. This is a major advantage, since it eliminates the need to preheat the inlet gas. Preheating requires expensive heat exchange equipment and special provisions for start-up. Secondly, water is the only reaction product and as noted above, it can easily be removed from the final product. Small quantities of unreacted hydrogen can frequently be tolerated in the final product. Thus, very little equipment is required downstream of the catalyst bed in order to meet final product specifications. Third, there is little or no catalyst deactivation when hydrogen is used as a reductant, provided the catalyst bed temperature is not allowed to exceed about 700° F. If a carbon containing reductant were used, the catalyst might deactivate rapidly due to coke formation.

However, the use of hydrogen for deoxygenation has two important disadvantages, hydrogen cost and hydrogen availability. The cost of the hydrogen required for oxygen removal can be a significant fraction of the final price of the inert gas, as high as 25% if the initial oxygen concentration is in the range of a few percent. In addition, if hydrogen is brought to the site of the inert gas plant in liquid form, an expensive cryogenic storage tank is required. Moreover, in certain parts of the world, hydrogen is not available in sufficiently large quantities to use for this application. This is a severe limitation when pure inert gas is needed in that particular region. Also, from a practical point of view, safe handling of hydrogen can present a problem.

The present invention provides a process for removing small amounts of oxygen from inert gas, such as nitrogen or argon, by means of the catalytic reaction of oxygen and methanol. Although it is known that methanol and oxygen will react to form carbon dioxide and water at elevated feed temperatures and at stoichiometric excesses of either oxygen or methanol, the present inventors have surprisingly found that this reaction can be brought about at low feed gas temperatures near ambient conditions of 60° to 120° F. at effectively stoichiometric mol ratios of oxygen to methanol of approximately 1.5:1 and without any long term significant catalyst deactivation or coking and without any external heating of the reactor.

In a preferred embodiment to the process, methanol is vaporized and mixed with the oxygen containing inert gas. The resulting stream is then passed through a catalytic reactor to promote the reaction:

$$CH_3OH + 3/2 O_2 \rightarrow CO_2 + 2H_2O$$

The inventors have found this reaction proceeds to completion leaving less than 10 ppm of oxygen in the effluent from the catalytic reactor even when the oxygen to methanol ratio is essentially stoichiometric, that is when the oxygen to methanol ratio to the catalytic reactor is 1.5:1. The effluent from the catalytic reactor contains the original inert gas, less than about 10 ppm of oxygen and up to several mole% each of water and carbon dioxide, depending upon the inlet oxygen concentration. Under some circumstances, for instance in the carburizing of metal parts and many inerting applications, this gas can be used directly without removing carbon dioxide and water. In many other applications, water and/or carbon dioxide must be removed before the gas can be utilized further. Removal of water and carbon dioxide can be accomplished by known means. Water removal is typically accomplished by cooling the effluent from the catalytic reactor to condense a portion of the water and then passing the gas into a bed of a sorbent, such as alumina or zeolite, to adsorb the remaining water. The sorbent is periodically regenerated by passing a purge stream through the bed at either elevated temperature (thermal regeneration, temperature swing regeneration) or reduced pressure (pressure swing regeneration). Carbon dioxide can be removed from the effluent gas by adsorption on a molecular sieve, such as 13X, with periodic regeneration of the adsorbent by either temperature swing or pressure swing techniques. If removal of both water and carbon dioxide is required, the effluent gas is first cooled to condense a portion of the water and then a single bed of adsorbents can be used to remove carbon dioxide and the remaining water by proper selection of the adsorbent or adsorbents and regeneration conditions. Selective membranes may also be utilized to remove the resulting water and carbon dioxide.

With the exception of hydrogen, methanol appears to be unique in its ability to simultaneously satisfy the following four requirements:
(1) react with low concentrations of oxygen at essentially ambient feed gas conditions without external heating of the reaction,
(2) remove oxygen to very low levels, such as less than 10 ppm at essentially a stoichiometric ratio with oxygen,
(3) operate for long periods of time without significant catalyst deactivation, and
(4) produce oxidation products that are innocuous and are easily removed from the inert gas, if necessary, prior to use of the inert gas.

Laboratory experiments of the present invention have illustrated the unique capability of stoichiometric amounts of methanol to remove oxygen to extremely low levels using a palladium catalyst, wherein the feed gas to the reactor was at essentially ambient conditions and no external heat was used for the reaction.

REACTIVITY EXAMPLE

A tubular catalytic reactor was loaded with various catalysts as set forht in Table 1 below. The reactor was constructed and insulated such that it was essentially adiabatic under operating conditions. Nitrogen containing oxygen as an impurity was fed to the reactor at a volumetric rate such that the space velocity of the catalyst bed was approximately 12,400 hr$^{-1}$ (space velocity approximate actual volumetric gas flow rate/volume of reactor occupied by catalyst). The feed oxygen concentration was varied from 0.25 vol% to 2.0 vol% over the course of the various runs as described below. The total pressure was 1 atmosphere absolute and the inlet gas temperature was about 70° F. throughout the runs. Initially, the methanol concentration was such that the oxygen/methanol mole ratio was essentially stoichiometric. If no reaction took place with a stoichiometric oxygen to methanol mole ratio at ambient reactor temperature, then a methanol-rich feed was tried in an attempt to initiate reaction. If methanol rich conditions did not lead to reaction, then elevated reactor temperatures were used to attempt to initiate reaction.

RUN #1

A catalyst comprising 0.5 wt% palladium on kaolin pellets was placed in the reactor described above and a feed gas comprising 2.0 mol% oxygen in nitrogen was fed into the reactor. Stoichiometric amounts of methanol were added and no reaction occurred. Next, additional methanol was added to provide a methanol rich stoichiometry without noticeable reaction. The reactor temperature was raised to 200° F. A reaction was noted under these conditions.

RUN #2

A similar run was performed to the above-described Run #1 wherein the oxygen concentration in the feed gas to the reactor was varied over the range of 0.25 to 2.0 mole%. No reaction was obtained at ambient reactor conditions. Additional methanol was added to the feed gas to result in methanol-rich stoichiometries. No reaction was noted under these conditions at a reactor temperature of 70° F.

RUN #3

The reactor described above was loaded with the same catalyst used in Run #1 except that the catalyst had been reduced in 5 mole% hydrogen in nitrogen at 200° F. for 30-60 minutes. A nitrogen containing feed gas having an oxygen concentration varying over the range of 0.25-2.0 mole% was introduced into the reactor. The reactor temperature was 85° F. No reaction was noted. Additional methanol was added to the feed gas to result in methanol rich stoichiometries. No reaction ws noted under these conditions.

RUN #4

The reactor described above was next filled with DEOXO catalyst comprising 0.28 wt% palladium on alumina pellets obtained from Engelhard Corporation. A feed gas comprising nitrogen with an oxygen concentration of 0.25 mole% was introduced into the reactor wherein the feed gas was further saturated with water. The reactor was unheated and at ambient temperature. An initial reaction between the oxygen and methanol was noted wherein the reactor effluent concentration of oxygen was less than 100 ppm.

RUN #5

The reactor described above was next filled with a catalyst comprising palladium nitrate on alumina which was 0.28 wt% palladium on alumina reduced in 5 mole% hydrogen in nitrogen at 200° F. for 30-60 minutes. A nitrogen feed gas containing an oxygen concentration of 2.0 mole% was introduced into the reactor at ambient reactor conditions. No reaction was noted. An excess of methanol over oxygen to methanol stoichiometries was introduced to the feed gas to create a methanol-rich condition. No reaction was noted. The reactor temperature was elevated to 125° F. Again, no reaction was noted.

RUN #6

The reactor described above was filled with an automotive catalyst comprising 0.037 wt% platinum comprising platinum oxide and 0.015 wt% palladium on alumina which was reduced in 5 mole% hydrogen in nitrogen at 200° F. for 30-60 minutes. A nitrogen feed gas containing 2.0 mole% oxygen was introduced into the reactor at ambient reactor temperature. No reaction was noted at 77° F. for the reactor. Additional methanol was added to the feed gas to produce a methanol-rich feed above the oxygen to methanol stoichiometries. Again, no reaction was noted.

This data derived from these experiments as reported in Table 1 below indicates that only select and specifically prepared catalysts are able to react methanol and oxygen at stoichiometric proportions at ambient feed conditions without external heating of the reactor. The most effective palladium catalysts require a high degree of dispersion and elemental metal form as is represented in the DEOXO catalyst.

TABLE 1

Reactivity Studies of $CH_3OH/O_2$ Mixtures[1] with Various Catalysts

| Run # | Catalyst | Feed $O_2$ Concentration (mole %) | Initial Reactor Temperature (°F.) | Reactive[8] |
|---|---|---|---|---|
| 1 | Pd/Kaolin[2] | 2.0 | 200 | Yes |
| 2 | Pd/Kaolin | 0.25-2.0 | 70 | No |
| 3 | Pd/Kaolin[2][3] | 0.25-2.0 | 85 | No |
| 4 | DEOXO[4] | 0.25-2.0[5] | 68 | Yes |
| 5 | Palladium Nitrate[6] on Alumina | 2.0 | 125 | No |
| 6 | Automotive[7] | 2.0 | 77 | No |

Footnotes:
[1] All Runs were carried out at ambient feed gas temperatures, and atmospheric pressures.
[2] 0.5 wt. % Palladium (Pd) in oxide or chloride form on Kaolin pellets, with a metal surface area of 0.56 m$^2$/g and a palladium dispersion of 26.8%.
[3] Reduced in 5 mole % $H_2$ in $N_2$ at 200° F. for 30 to 60 minutes.
[4] 0.28 wt. % Pd in metal form on alumina pellets, as received from Engelhard Corporation with a metal surface area of 0.42 m$^2$/g and a palladium dispersion of 33.9%.
[5] Feed gas saturated with $H_2O$.
[6] 0.039 wt. % Pd on alumina, reduced as per Footnote 3 with a metal surface area of 0.06 m$^2$/g and a palladium dispersion of 33.3%.
[7] 0.037 wt. % Platinum (PtO) and 0.015 wt. % Pd on alumina, reduced as per Footnote 3.
[8] "Yes" if steady-state $O_2$ concentration in reactor effluent was less than 100 ppm.

Aging Example

A tubular catalytic reactor was loaded with Deoxo catalyst which catalyst was reduced at 200° F. for 60 minutes with a gas comprising 2 vol% $H_2$ in $N_2$. The reactor was constructed and insulated such that it was essentially adiabatic under operating conditions. $N_2$ containing $O_2$ as an impurity was fed to the reactor at a volumetric rate such that the space velocity of the catalyst bed was approximately 12,400 hr.$^{-1}$ (space velocity is defined as actual volumetric gas flow rate/volume of reactor occupied by catalyst). The $O_2$ concentration was varied from 0.25 vol.% to 2.0 vol.% over the course of the run, as described below. The total pressure was 1 atm. abs. and the inlet gas temperature was about 70° F. throughout the run. The data for the runs of this Example are reported in Table 2.

RUN #1

The initial inlet $O_2$ concentration was 2.0 vol.%. The $CH_3OH$ addition rate was set so that about a stoichiometric amount of $CH_3OH$, relative to $O_2$, was added to the inlet gas, i.e., about 1 mole of $CH_3OH$ per 1.5 mole of inlet $O_2$. These conditions were maintained for 78 hours. The $O_2$ concentration in the reactor effluent was less than 5 ppm, at all times during this segment of the run, with an average of about 1-2 ppm. There was no upward trend of the outlet $O_2$ concentration with time, indicating no significant catalyst deactivation. The CO level was below the limits of detection, as were the concentrations of methane, ethane, ethylene and acetylene. The $CO_2$ concentration in the effluent was 1.4 vol.%, which is the theoretical concentration for complete oxidation of the $CH_3OH$. The effluent $O_2$ concentration was measured by using a DELTA-F trace oxygen analyzer and the effluent CO, $CO_2$ $N_2$, $CH_4$, $C_2H_4$ and $C_2H_6$ concentrations were measured by using a CARLE Series 5 gas chromatograph.

This data illustrates that $O_2$ can be removed from an inert gas stream to levels well below 10 ppm. with a stoichiometric quantity of $CH_3OH$ with the inlet gas at ambient conditions, and without any noticeable catalyst deactivation. The data shows that $CO_2$ and $H_2O$ are the only species that must be removed from the reactor effluent in order to make a high-purity $N_2$ stream.

RUN #2

The $O_2$ concentration in the feed gas was reduced to 0.25 vol.% and the feed gas was passed through a water saturator. The $CH_3OH$ was also reduced to maintain a stoichiometric $CH_3OH/O_2$ ratio. The reactor was operated at these conditions for 12 hours. Even at these relatively mild conditions (dilute $O_2$ content and high water content), $O_2$ was essentially completely removed from the $N_2$; the effluent $O_2$ concentration was 2 ppm or less throughout this Run #2. Analyses of the reactor effluent showed no evidence of reaction products other than $CO_2$ and $H_2O$. No catalyst deactivation was evident from the data.

This data illustrates that $O_2$ can be effectively removed from an inert gas even when the inlet $O_2$ concentration is relatively low and the feed is saturated with water. They also show that, under these conditions, $CO_2$ and $H_2O$ are the only species that must be removed from the reactor effluent in order to make high purity $N_2$.

TABLE 2

| AGING RUN CONDITIONS AND RESULTS | | |
|---|---|---|
| | RUN #1 | RUN #2 |
| Catalyst | DEOXO | DEOXO |
| Fuel | Methanol* | Methanol* |
| Gas Velocity, cm/sec | 53.9** | 53.9** |
| Contact time, sec | 0.29 | 0.29 |
| Catalyst Bed L/D | 3.4 | 3.4 |
| Inlet Oxygen, V % | 2.0% $O_2$ | 0.25% $O_2$*** |
| Exit Oxygen, ppm | <4 | <4 |
| Exit CO, mole % | 0.0 | 0.0 |
| Exit $CO_2$, mole % | 1.4 | 0.2 |

\* = at stoichiometric ratio for $CO_2$ production
\*\* = maximum attainable velocity
\*\*\* = water saturated feed gas Based upon these results, it appears that the preferred catalyst for this process contains between 0.05 and 1.0 wt.% palladium in reduced and a highly dispersed form. The preferred catalyst must have an active surface area (metal area) as measured by $O_2$ chemisorption of at least 0.4 $m^2/g$ and a palladium dispersion of at least 30.0%. Also the preferred catalyst must be in the metallic palladium form. However, other catalysts have at least some activity at other conditions, such as higher temperature.

Appropriate operating conditions for the process of the present invention include an inlet temperature preferably above approximately 68° F. Although an inlet feed gas temperature range of 60° to 120° F. is believed to result in operable conditions, other temperatures are possible, but if the combination of inlet temperature and inlet oxygen concentration is too high, the reaction exotherm will cause permanent damage to the catalyst if the reaction is carried out in a single stage adiabatic reactor. The optimal inlet temperature range is 60° to 75° F. A series of staged catalytic reactors with cooling between each stage can be used to circumvent this problem. In general, within temperature range limitations, higher inlet temperatures produce increased reaction rates. With regard to inlet pressure, it appears that the process is operable over a wide range of inlet pressures. For economic and safety reasons, the pressure should not be less than 1 atmosphere absolute.

With regard to the inlet oxygen concentration, it has been found that the process is desirable over a range of inlet oxygen concentrations from about 10 ppm to about 10 mole%. Below about 10 ppm oxygen, there may be a problem in initiating the reaction without external heat. Above about 10 mole% oxygen, the economics of oxygen removal with methanol become unfavorable and other methods are preferred for lowering the oxygen concentration. It should be noted that the maximum oxygen concentration that can be removed economically is significantly higher when methanol is used as the deoxygenation agent, than when hydrogen is used. Finally, with regard to space velocity, it appears that the process is operable over a wide range of space velocities (actual volumetric flow rate of gas/volume occupied by catalyst) from 0.10 hr.$^{-1}$ to about 100,000 hr.$^{-1}$ with a preferred range of about 5,000 hr.$^{-1}$ to about 20,000 hrs.$^{-1}$. At very low space velocities, catalyst and reactor costs are excessive. At very high space velocities, fractional conversion of oxygen is diminished and the concentration of oxygen in the reactor effluent will exceed the target level, which is typically less than 10 ppm oxygen.

As can be seen, the present invention offers a unique and attractive alternative for large scale oxygen scavenging of inert gas streams with favorable economics over the most widely practical alternative using hydrogen as the scavenger or reductant. Methanol can be used in place of hydrogen to remove oxygen from inert gas streams to concentrations well below 10 ppm of oxygen. Methanol is substantially cheaper to use for this application than hydrogen and is more widely available and transportable. Moreover, methanol possesses the same important characteristics that make hydrogen a preferred material for oxygen removal, namely:

(1) it is highly reactive at ambient feed conditions over certain catalysts, without the need for external heating of the reaction,
(2) its reaction products are innocuous and are easy to remove from the product stream if necessary,
(3) it is effective when employed in stoichiometric proportions to the oxygen being removed, i.e., an excess is not required to produce essentially complete oxygen removal, and (4) there is no evidence of rapid catalyst deactivation due to coke formation.

The scope of the present invention should be ascertained from the claims which follow.

We claim:

1. A process for essentially complete removal of minor amounts of oxygen of approximately 0.1 to 10 mole% from inert gas streams comprising reacting a stoichiometric amount of methanol with said oxygen at a feed gas temperature in the range of approximately 60° to 120° F. in the presence of a catalyst containing approximately 0.05 to 1.0 wt% palladium in the metal form with a metal surface area of at least 0.4 m$^2$/g and a palladium dispersion of at least 30% to convert the oxygen and methanol to carbon dioxide and water without external heating of the reaction.

2. The process of claim 1 wherein after the reaction of methanol and oxygen the oxygen content of the inert gas is no more than 10 ppm oxygen.

3. The process of claim 1 wherein the inert gas is nitrogen.

4. The process of claim 1 wherein the inert gas is argon.

5. The process of claim 1 wherein the catalyst is palladium on an alumina support.

6. The process of claim 1 wherein after the reaction of methanol and oxygen the inert gas stream containing carbon dioxide and water is further treated by passage through sorptive beds to selectively remove said carbon dioxide and water.

7. The process of claim 1 wherein after the reaction of methanol and oxygen the inert gas stream containing carbon dioxide and water is cooled to condense out the major amount of water, passed through a bed of alumina or a zeolite to remove residual water and passed through a bed of zeolite to remove carbon dioxide.

8. The process of claim 1 wherein the feed gas temperature is approximately 68° F.

9. The process of claim 1 wherein the reaction has a space velocity in the range of approximately 0.10 hour$^{-1}$ up to about 100,000 hr$^{-1}$.

10. The process of claim 1 wherein the reaction has a space velocity in the range of approximately 5000 hour$^{-1}$ up to 20,000 hour$^{-1}$.

11. The process of claim 1 wherein the inert gas stream is saturated with water prior to the reaction of methanol and oxygen.

12. The process of claim 1 wherein the feed gas temperature is in the range of 60° to 75° F.

13. The process of claim 1 wherein carbon dioxide and water are removed from said inert gas stream by the use of a selective membrane.

14. The process of claim 1 wherein the reaction between oxygen and methanol is performed in one or more fixed-bed catalytic reactors.

* * * * *